No. 750,445. PATENTED JAN. 26, 1904.
C. FORCKE.
BAKING MOLD.
APPLICATION FILED JUNE 11, 1903.
NO MODEL.

Witnesses:
Edward Ray
William Schulz

Inventor:
Carl Forcke
by his attorney
Frank V. Briesen

No. 750,445.

Patented January 26, 1904.

UNITED STATES PATENT OFFICE.

CARL FORCKE, OF HANOVER, GERMANY.

BAKING-MOLD.

SPECIFICATION forming part of Letters Patent No. 750,445, dated January 26, 1904.

Application filed June 11, 1903. Serial No. 160,992. (No model.)

*To all whom it may concern:*

Be it known that I, CARL FORCKE, a citizen of Germany, residing at Hanover, Germany, have invented new and useful Improvements in Baking-Molds, of which the following is a specification.

This invention relates to an improved baking-mold, and more particularly to improved means for thoroughly heating the upper and lower sections of the mold.

Figure 1:
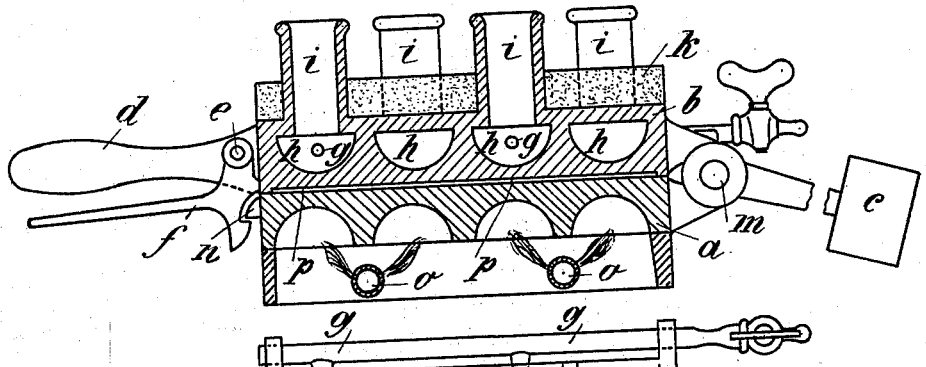
Figure 2:
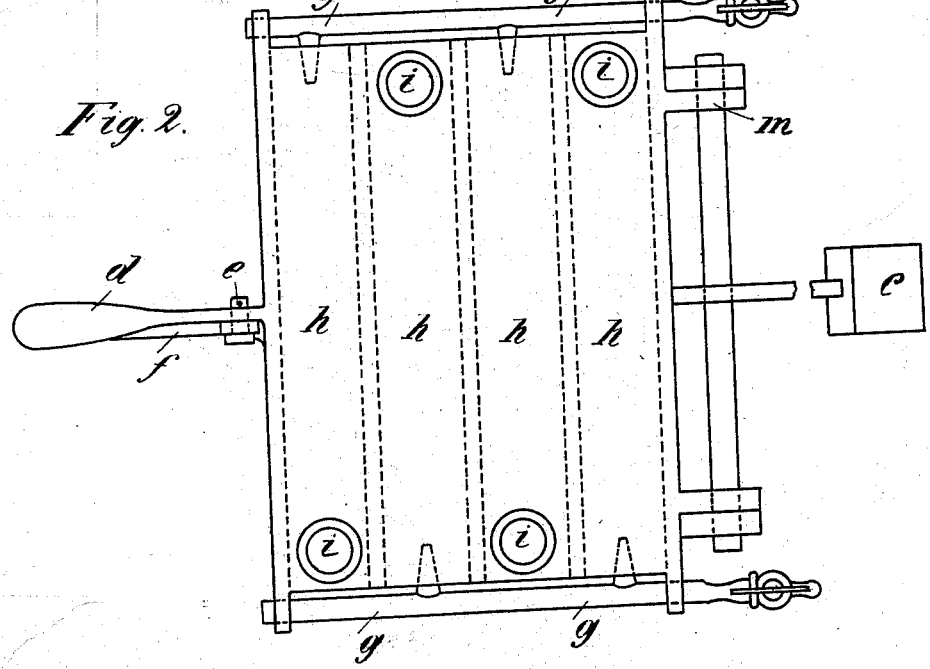

In the accompanying drawings, Figure 1 is a vertical section of my improved baking-mold, and Fig. 2 a plan of the same.

The mold is composed, essentially, of a lower section $a$ and a movable upper section $b$. Within the upper section $b$ are formed a series of parallel chambers $h$. Into one end of each chamber projects the nozzle or burner $g$ of a gas-pipe, such burner being surrounded by an air-inlet opening. At its opposite end each chamber is provided with a chimney $i$, so that the heated gases flow through the entire length of the chamber before being discharged. I alternate the inlet end and burner of one chamber with the exit end and chimney of the adjoining chamber, Fig. 2, and in this way the burners besides fulfilling their main function of heating their own chamber perform the additional function of heating the flue end of the adjoining chamber. Thus a draft is quickly started in all chambers, and the entire mold is rapidly and uniformly heated. In order to prevent an upward radiation of the heat, the upper part $b$ of the mold is provided with an insulating layer or packing $k$.

The halves $a$ and $b$ of the mold can be connected to each other by means of a hinge $m$, and the fastening can be effected by a catch $f$, pivoted at $e$, said catch engaging a projection $n$ on the lower part of the mold. To allow of convenient opening, the upper part of the mold can be provided with a handle $d$ and at the opposite side with a counterweight $c$.

The lower half of the mold can be heated by any suitable means—for instance, the burners $o$. In this lower half hollow spaces for heating can also be provided. The mass (wafer) to be baked is contained in the hollow space $p$, Fig. 1, between the two parts of the mold, and by means of the new arrangement described this hollow space is uniformly heated from above and below.

What I claim is—

1. A baking-mold composed of a lower section and an upper movable section, means for heating the lower section, a chamber in the upper section, a gas-nozzle and an air-inlet at one end of the chamber, and a chimney at the other end, substantially as specified.

2. A baking-mold composed of a lower section and an upper movable section, means for heating the lower section, a series of parallel chambers in the upper section, each chamber being provided with a gas-nozzle and an air-inlet at one end and with a chimney at the other end, and a packing above the chambers, substantially as specified.

3. A baking-mold provided with a series of parallel chambers, each chamber having a gas-nozzle and air-inlet at one end, and a chimney at the other end, the inlet end of one chamber alternating with the exit end of the adjoining chamber, substantially as specified.

In testimony whereof I affix my signature to this specification in the presence of two witnesses.

CARL FORCKE.

Witnesses:
 LEONORE RASCH,
 HERMINE GÄDECKE.